United States Patent
Shen

(10) Patent No.: US 9,110,652 B2
(45) Date of Patent: Aug. 18, 2015

(54) SYSTEM AND METHOD FOR ELECTRONIC DEVICE CHARGING

(75) Inventor: Yai-Nan Shen, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 456 days.

(21) Appl. No.: 13/316,465

(22) Filed: Dec. 10, 2011

(65) Prior Publication Data

US 2012/0212189 A1 Aug. 23, 2012

(30) Foreign Application Priority Data

Dec. 30, 2010 (TW) .............................. 99147057 A

(51) Int. Cl.
*H02J 7/00* (2006.01)
*H02J 7/14* (2006.01)
*G06F 1/26* (2006.01)

(52) U.S. Cl.
CPC ................. *G06F 1/266* (2013.01); *H02J 7/008* (2013.01); *H02J 7/0077* (2013.01); *H02J 7/0086* (2013.01); *H02J 2007/0062* (2013.01)

(58) Field of Classification Search
CPC ........... H02J 7/00; H02J 7/045; H02J 7/0031; H02J 7/032
USPC ......... 320/161, 162, 163, 164, 148, 149, 165, 320/139, 107, 137, 132, 106, 114, 128
See application file for complete search history.

(56) References Cited

U.S. PATENT DOCUMENTS

| | | | | |
|---|---|---|---|---|
| 6,946,817 B2* | 9/2005 | Fischer et al. | ................. | 320/132 |
| 2002/0038432 A1* | 3/2002 | Hsu | ................. | 713/300 |
| 2006/0033474 A1* | 2/2006 | Shum | ................. | 320/128 |
| 2009/0009140 A1* | 1/2009 | Kim | ................. | 320/139 |
| 2009/0102431 A1* | 4/2009 | Kung et al. | ................. | 320/162 |
| 2009/0200982 A1* | 8/2009 | Hurtz | ................. | 320/103 |
| 2010/0164440 A1* | 7/2010 | Ikeda | ................. | 320/162 |
| 2010/0301813 A1* | 12/2010 | Esnard et al. | ................. | 320/162 |

FOREIGN PATENT DOCUMENTS

CN 101371212 A 2/2009

* cited by examiner

*Primary Examiner* — Edward Tso
*Assistant Examiner* — Alexis A Boateng
(74) *Attorney, Agent, or Firm* — Novak Druce Connolly Bove + Quigg LLP

(57) ABSTRACT

An electronic device which is able to be charged via a universal serial bus (USB) interface which connects to a computer. A first voltage of a battery of the electronic device, a second voltage and an electric current of the USB interface are determined. If a difference between the first voltage and a saturation voltage of the battery is greater than a predefined value, the electronic device is charged with a first electric current. If the second voltage is not lower than a threshold voltage and the electric current of the USB interface is not lower than the electrical energy consumption of the electronic device, the first electric current is decreased.

9 Claims, 3 Drawing Sheets

SYSTEM AND METHOD FOR ELECTRONIC DEVICE CHARGING

BACKGROUND

1. Technical Field

Embodiments of the present disclosure relate to electronic device management systems and methods, and more particularly to a system and method for electronic device charging.

2. Description of Related Art

When an electronic device is connected to a computer via a universal serial bus (USB) interface, the USB interface can both transfer data and charge or recharge the electronic device. If the electronic device needs to be charged quickly, it is necessary to charge the electronic device with a large electric current. However, if the electric current is too large, the computer cannot recognize the electronic device.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
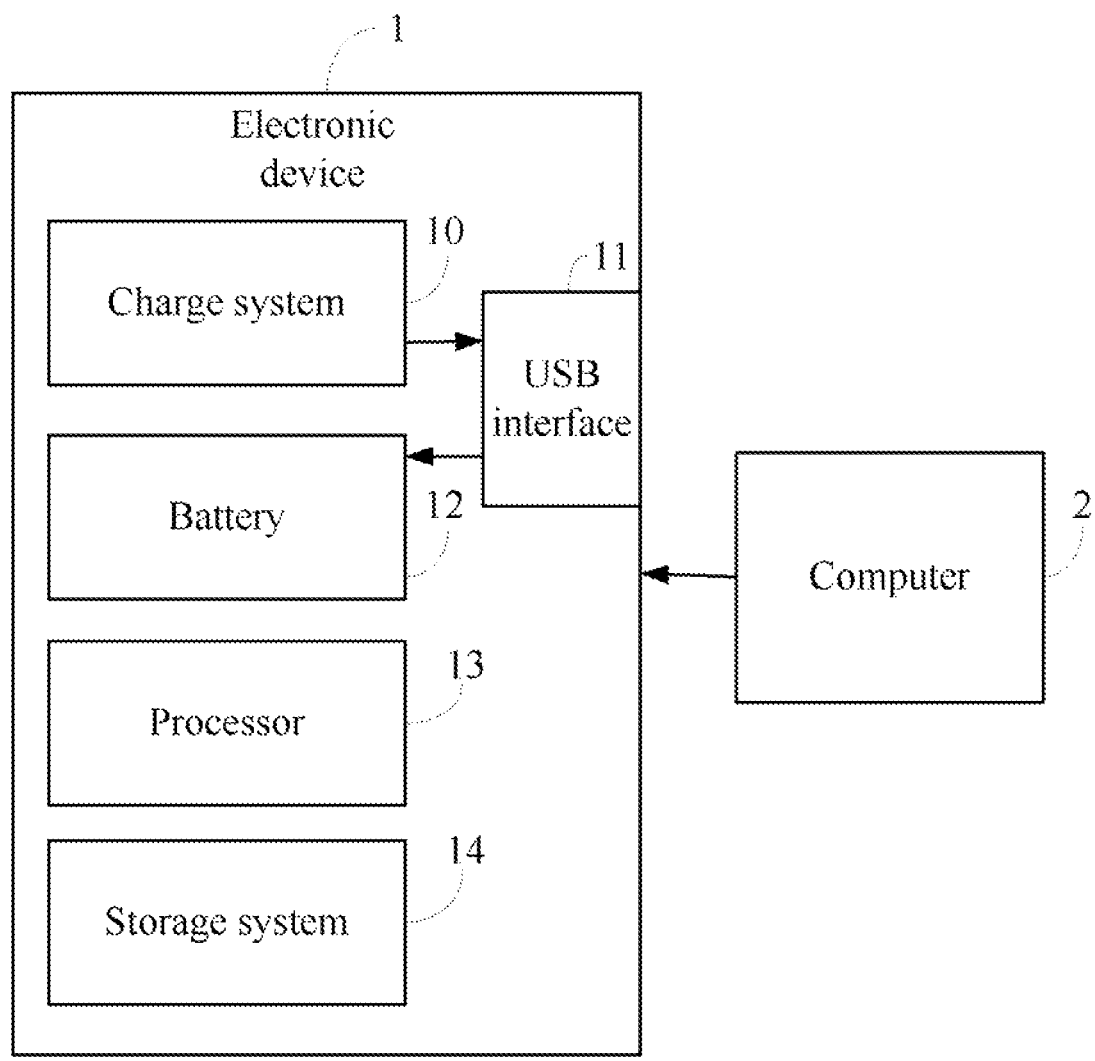
FIG. 1 is a block diagram of one embodiment of an electronic device comprising a charging system.

FIG. 1 is a block diagram of one embodiment of an electronic device 1 comprising a charging system 10. In another embodiment, the electronic device 1 may be a mobile phone or a music player. The electronic device 1 includes a universal serial bus (USB) interface 11 and a battery 12. The USB interface 11 connects to a computer 2. The computer 2 controls the charging system 10 to charge the battery 12 of the electronic device 1 as required.

In an exemplary embodiment, the electronic device 1 includes at least one processor 13 and a storage system 14. The charging system 10 may include one or more modules. The one or more modules may comprise computerized code in the form of one or more programs that are stored in the storage system 14 (or memory). In one embodiment, the storage system 14 may be a magnetic or an optical storage system, such as a flash memory, or other suitable storage medium. The computerized code includes instructions that are executed by the at least one processor 13 to provide functions for the one or more modules.

Figure 2:
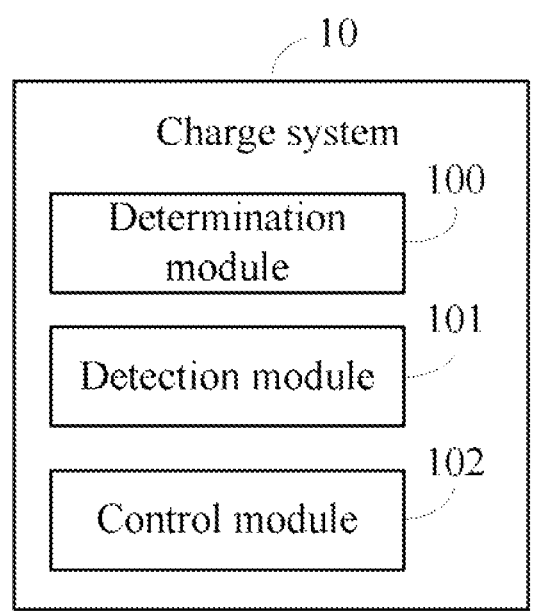
FIG. 2 is a block diagram of one embodiment of the function modules of the charging system in FIG. 1.

As shown in FIG. 2, the charging system 10 may include a determination module 100, a detection module 101, and a control module 102.

The determination module 100 determines a first voltage of the battery 12, and a second voltage and an electric current passing through the USB interface 11.

The detection module 101 detects if a difference between the first voltage of the battery 12 as determined and a saturation voltage of the battery 12 is greater than a predefined value. The battery 12 has a minimum electric current and a maximum electric current. The minimum electric current and the maximum electric current of the battery 12 are determined by the type of the battery 12. The saturation voltage is a difference between a voltage corresponding to the minimum electric current and a voltage corresponding to the maximum electric current. If the difference is greater than the predefined value, the control module 102 charges the battery 12 with a first electric current equal to a first value (first electric current value). The first electric current is charged from the computer 2. If the difference is not greater than the predefined value, the control module 102 charges the battery 12 with a second electric current equal to a second value (second electric current value). The second electric current is charged from the computer 2. The first electric current value is greater than the second electric current value. In one embodiment, if the electronic device 1 is a mobile phone, the predefined value is 0.1 (V), the first electric current value is 500 (mA), and the second electric current value is 100 (mA).

The detection module 101 further detects if the second voltage of the USB interface 11 is lower than the lowest level of voltage below which an electronic device cannot be recognized by the computer (threshold voltage). In one embodiment, the threshold value is 3.5 (V).

If the second voltage of the USB interface 11 is not lower than the threshold voltage, the control module 102 charges the battery 12 with the second electric current.

If the second voltage of the USB interface 11 is lower than the threshold voltage, the detection module 101 detects if the electric current of the battery 12 is lower than an electrical energy consumption of the electronic device 1. The electrical energy consumption of the electronic device 1 is the amount of electrical power being consumed by application programs running in the electronic device 1. If the electric current of the battery 12 is lower than the electrical energy consumption of the electronic device 1, the electronic device 1 cannot be recognized by the computer 2. If the electric current of the battery 12 is not lower than the electrical energy consumption of the electronic device 1, the control module 102 decreases the first electric current by a preset electric current value (e.g., 500 mA). In one embodiment, the first electric current may be decreased by 50 mA each time.

Figure 3:
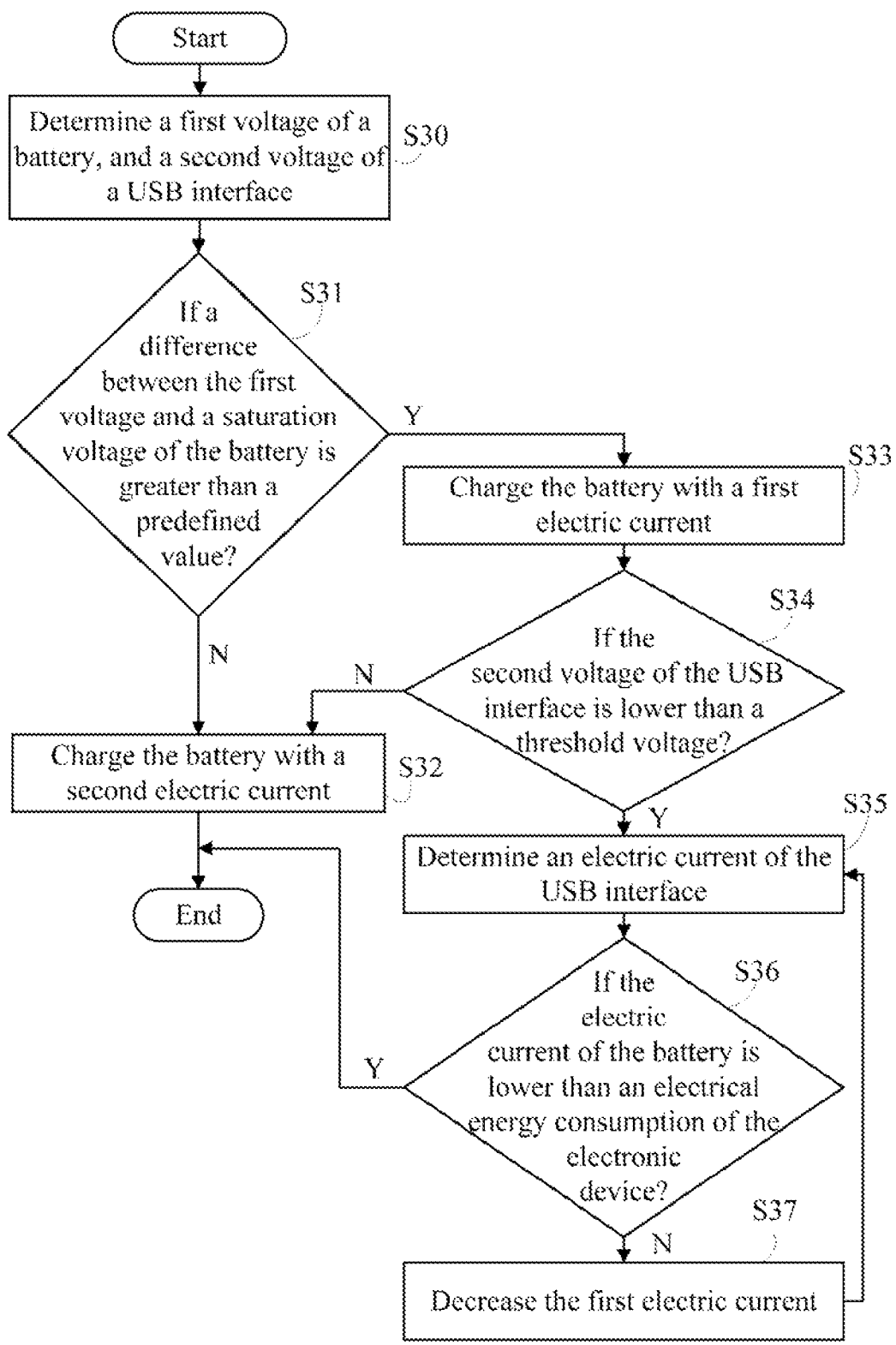
FIG. 3 is a flowchart illustrating one embodiment of a method for charging an electronic device.

FIG. 3 is a flowchart illustrating a method for charging the electronic device. Depending on the embodiment, additional blocks may be added, others removed, and the ordering of the blocks may be changed.

In block S30, the determination module 100 determines a first voltage of the battery 12, and a second voltage of the USB interface 11.

In block S31, the detection module 101 detects if a difference between the first voltage of the battery 12 and a saturation voltage of the battery 12 is greater than a predefined value. If the difference is not greater than the predefined value, block S32 is implemented. If the difference is greater than the predefined value, block S33 is implemented.

In block S32, the control module 102 charges the battery 12 with a second electric current, and the procedure ends.

In block S33, the control module 102 charges the battery 12 with a first electric current.

In block S34, the detection module 101 detects if the second voltage of the USB interface 11 is lower than the threshold voltage. If the second voltage of the USB interface 11 is lower than the threshold voltage, block S35 is implemented. If the second voltage of the USB interface 11 is not lower than the threshold value, block S32 is repeated.

In block S35, the determination module 100 determines an electric current of the USB interface 11.

In block S36, the detection module 101 detects if the electric current of the battery 12 is lower than an electrical energy consumption of the electronic device 1. If the electric current of the battery 12 is not lower than the electrical energy consumption of the electronic device 1, block S37 is implemented. If the electric current of the battery 12 is lower than the electrical energy consumption of the electronic device 1, the procedure ends.

In block S37, the control module 102 decreases the first electric current by a preset electric current value (e.g., 500 mA), and then block S35 is repeated.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
    a storage system;
    a battery having a minimum electric current and a maximum electric current, wherein the minimum electric current and the maximum electric current are determined by a type of the battery;
    at least one processor; and
    one or more programs being stored in the storage system and executable by the at least one processor, the one or more programs comprising:
    a control module operable to charge the electronic device with a first electric current from a computer connected with the electronic device via a universal serial bus (USB) interface of the electronic device when a difference between a battery voltage of the battery and a saturation voltage of the battery is greater than a predefined value, wherein the saturation voltage is a difference between a voltage corresponding to the minimum electric current and a voltage corresponding to the maximum electric current;
    a determination module operable to determine a USB interface voltage of the USB interface of the electronic device;
    a detection module operable to detect if the USB interface voltage is lower than a threshold voltage, wherein the threshold voltage is a lowest voltage that the electronic device can be recognized by the computer;
    the control module further operable to charge the electronic device with a second electric current from the computer when the USB interface voltage is not lower than the threshold voltage;
    the determination module further operable to determine an electric current of the USB interface of the electronic device when the USB interface voltage is lower than the threshold voltage; and
    the control module further operable to decrease the first electric current by a preset electric current value when the electric current determined by the determination module is not lower than an electrical energy consumption of the electronic device.

2. The electronic device as described in claim 1, wherein the control module is further operable to charge the electronic device with the second electric current when the difference between the battery voltage and the saturation voltage of the battery is not greater than the predefined value.

3. The electronic device as described in claim 2, wherein the first electric current is greater than the second electric current.

4. A computer-based method for charging an electronic device, comprising:
    charging the electronic device, which comprises a battery, with a first electric current from a computer connected with the electronic device via a universal serial bus (USB) interface of the electronic device when a difference between a battery voltage of the battery and a saturation voltage of the battery is greater than a predefined value, wherein the battery has a minimum electric current and a maximum electric current, the minimum electric current and the maximum electric current are determined by a type of the battery, and the saturation voltage is a difference between a voltage corresponding to the minimum electric current and a voltage corresponding to the maximum electric current;
    determining a USB interface voltage of the USB interface of the electronic device;
    detecting if the USB interface voltage is lower than a threshold voltage, wherein the threshold voltage is a lowest voltage that the electronic device can be recognized by the computer;
    charging the electronic device with a second electric current from the computer when the USB interface voltage is not lower than the threshold voltage;
    determining an electric current of the USB interface of the electronic device when the USB interface voltage is lower than the threshold voltage; and
    decreasing the first electric current by a preset electric current value when the determined electric current of the USB interface is not lower than an electrical energy consumption of the electronic device.

5. The method as described in claim 4, further comprising:
    charging the electronic device with the second electric current when the difference between the battery voltage and the saturation voltage of the battery is not greater than the predefined value.

6. The method as described in claim 4, wherein the first electric current is greater than the second electric current.

7. A non-transitory storage medium having stored thereon instructions that, when executed by a processor, cause the processor to perform a method for charging electronic device, the method comprising:
    charging the electronic device, which comprises a battery, with a first electric current from a computer connected with the electronic device via a universal serial bus (USB) interface of the electronic device when a difference between a battery voltage of the battery and a saturation voltage of the battery is greater than a predefined value, wherein the battery has a minimum electric current and a maximum electric current, the minimum electric current and the maximum electric current are determined by a type of the battery, and the saturation voltage is a difference between a voltage corresponding to the minimum electric current and a voltage corresponding to the maximum electric current;
    determining a USB interface voltage of the USB interface of the electronic device;

detecting if the USB interface voltage is lower than a threshold voltage, wherein the threshold voltage is a lowest voltage that the electronic device can be recognized by the computer;

charging the electronic device with a second electric current from the computer when the USB interface voltage is not lower than the threshold voltage;

determining an electric current of the USB interface of the electronic device when the USB interface voltage is lower than the threshold voltage; and decreasing the first electric current by a preset electric current value when the determined electric current of the USB interface is not lower than an electrical energy consumption of the electronic device.

8. The non-transitory storage medium as described in claim 7, wherein the method further comprising:

charging the electronic device with the second electric current when the difference between the battery voltage and the saturation voltage of the battery is not greater than the predefined value.

9. The non-transitory storage medium as described in claim 7, wherein the first electric current is greater than the second electric current.

\* \* \* \* \*